(12) United States Patent
Wetoschkin et al.

(10) Patent No.: US 12,181,614 B2
(45) Date of Patent: Dec. 31, 2024

(54) METHOD FOR ESTIMATING CORRECTION ANGLES IN A RADAR SENSOR FOR MOTOR VEHICLES

(71) Applicant: Robert Bosch GmbH, Stuttgart (DE)

(72) Inventors: Igor Wetoschkin, Freiberg (DE); Marcus Steffen Reiher, Renningen (DE)

(73) Assignee: ROBERT BOSCH GMBH, Stuttgart (DE)

(*) Notice: Subject to any disclaimer, the term of this patent is extended or adjusted under 35 U.S.C. 154(b) by 359 days.

(21) Appl. No.: 17/771,526

(22) PCT Filed: Oct. 29, 2020

(86) PCT No.: PCT/EP2020/080390
§ 371 (c)(1),
(2) Date: Apr. 25, 2022

(87) PCT Pub. No.: WO2021/121750
PCT Pub. Date: Jun. 24, 2021

(65) Prior Publication Data
US 2022/0365193 A1 Nov. 17, 2022

(30) Foreign Application Priority Data
Dec. 16, 2019 (DE) .................. 10 2019 219 653.5

(51) Int. Cl.
*G01S 7/497* (2006.01)
*G01S 7/40* (2006.01)
*G01S 13/931* (2020.01)

(52) U.S. Cl.
CPC .......... *G01S 7/4972* (2013.01); *G01S 7/4026* (2013.01); *G01S 13/931* (2013.01); *G01S 2013/93271* (2020.01)

(58) Field of Classification Search
CPC .... G01S 7/4026; G01S 7/4972; G01S 13/931; G01S 2013/93271
(Continued)

(56) References Cited

U.S. PATENT DOCUMENTS 4,929,952 A 5/1990 Schneider et al.
2019/0369234 A1* 12/2019 Wetoschkin .......... B60W 50/14

FOREIGN PATENT DOCUMENTS

DE 102006045165 A1 4/2008
DE 102013203574 A1 9/2014
(Continued)

OTHER PUBLICATIONS

Steinbuch et al., DE 102013208736 A1: "Method and Device for Determining and Compensating for a Misalignment Angle of a Radar Sensor of a Vehicle", Published: Nov. 13, 2014 (Year: 2014).*
(Continued)

*Primary Examiner* — John H Le
(74) *Attorney, Agent, or Firm* — NORTON ROSE FULBRIGHT US LLP; Gerard A. Messina

(57) ABSTRACT

A method for estimating correction angles in a radar sensor for motor vehicles, by which method a correction angle that considers a misalignment of the radar sensor is calculated by a statistical evaluation of positioning data that were recorded by the radar sensor. The positioning angle range of the radar sensor is subdivided into multiple sectors. The statistical evaluation of the positioning data for the different sectors is performed separately for the different sectors so that an individual correction angle is obtained for each sector.

7 Claims, 3 Drawing Sheets

(58) Field of Classification Search
USPC .......................................................... 702/104
See application file for complete search history.

(56) References Cited

FOREIGN PATENT DOCUMENTS

| | | |
|---|---|---|
| DE | 102014223461 A1 | 5/2016 |
| JP | H07120555 A | 5/1995 |
| JP | 2001166051 A | 6/2001 |
| JP | 2008261887 A | 10/2008 |
| JP | 2014089114 A | 5/2014 |
| WO | 2007015288 A1 | 2/2007 |

OTHER PUBLICATIONS

International Search Report for PCT/EP2020/080390, Issued Jan. 29, 2021.

\* cited by examiner

METHOD FOR ESTIMATING CORRECTION ANGLES IN A RADAR SENSOR FOR MOTOR VEHICLES

FIELD

The present invention relates to a method for estimating correction angles in a radar sensor for motor vehicles, by which method a correction angle that takes a misalignment of the radar sensor into account is calculated by a statistical evaluation of positioning data that were recorded by the radar sensor.

BACKGROUND INFORMATION

Motor vehicles use angle-resolving radar sensors for different assistance functions, e.g., for an automatic distance control, for collision warning and emergency braking systems and the like, up to and including systems that are meant to enable completely autonomous driving in the future.

In most assistance systems of this type, at least one radar sensor is installed in the front area of the vehicle in such a way that its optical axis coincides with the longitudinal axis of the vehicle so that the positioning angles measured for every object by the radar sensor indicate an angle deviation of the respective object in relation to the longitudinal axis of the ego vehicle.

Since not only the azimuth angles but also the elevation angles of the detected objects are required for some assistance functions, the radar sensor should furthermore be adjusted in such a way that its optical axis extends horizontally and can be used as a reference for angle measurements in elevation.

If the optical axis of the radar sensor is not correctly adjusted, e.g., because of production tolerances of the radar sensor, installation errors in the installation of the radar sensor in the vehicle or also as the result of mechanical effects such as parking dents during the vehicle operation, then the results of all angle measurements are falsified by a misalignment angle of the radar sensor.

To avoid faulty angle measurements and therefore faulty assessments of the traffic situation, the radar sensor can be calibrated after its installation in the vehicle with the aid of a relatively complex and lengthy measuring procedure so that a possibly existing adjustment error is able to be measured and then computationally corrected at a later point during the evaluation of the data.

Methods are also available that allow for a check and possibly a correction of the adjustment errors even while the vehicle is in operation. Examples of such methods are described in German Patent Application No. DE 10 2006 045 165 A1.

In general, these methods include a statistical evaluation of the positioning data for the objects detected by the radar sensor. For example, if the azimuth angle of a vehicle driving directly in front in the same lane is measured, then the average time value of the azimuth angles should converge toward 0° in a correct adjustment of the sensor insofar as the vehicle traveling ahead will be offset slightly to the right or slightly to the left in relation to the ego vehicle at the same probability.

Another method for measuring an adjustment error is based on the notion that stationary objects at the edge of a road do not change their relative lateral position during travel, at least not as long as the ego vehicle does not execute any transverse movements. If the azimuth angle of such an object is tracked over a certain period of time while driving, then the azimuth angle has a characteristic time dependency because of the parallactic displacement that occurs while driving. If an adjustment error is present, this time dependency is changed, and an apparent movement of the actually stationary object in the transverse direction of the vehicle is detected. Based on this effect, the adjustment error is able to be determined in quantitative terms. However, the result may be falsified on account of measuring inaccuracies. Even if the ego vehicle executes a slight transverse movement during the measuring period, measuring errors may arise if no compensation of the transverse movement of the ego vehicle occurs. In this method, too, data for multiple objects are usually recorded in order to increase the accuracy, and the adjustment error is then determined by statistical averaging.

With increasing complexity of the assistance functions, the demands on the accuracy of the angle measurements increase as well. Especially in the case of radar sensors that are oriented toward the front in the driving direction, it is desired—in the sense of a 'predictive' behavior of the assistance function—that the traffic scenario can also be monitored at a relatively great distance in front of the ego vehicle. However, since the lateral position of the detected objects in a Cartesian coordinate system is proportional to the azimuth angle and to the distance of the object, the effect of errors in a measurement of the azimuth angle increases in proportion to the increase in the distance of the object.

SUMMARY

It is an object of the present invention to provide a method of the type mentioned above that makes it possible to estimate correction angles with greater accuracy.

According to an example embodiment of the present invention, this object may be achieved in that the positioning angle range of the radar sensor is subdivided into multiple sectors, and the statistical evaluation of the positioning data for the different sectors is carried out separately so that an individual correction angle is obtained for each sector.

The method according to an example embodiment of the present invention takes account of the fact that errors in the angle measurement may be caused not only by a misalignment of the sensor but can also be the result of systematic angle errors as a result of deviations in the optical path of the radar beams and/or errors in the evaluation of the measuring signals. For example, such systematic angle errors may arise when the radar sensor includes a condenser lens having certain production tolerances or, for example, when the radar sensor is installed behind a bumper of the vehicle and a deflection of the radar beams occurs, e.g., like in a prism, on account of the shape of the bumper or possibly also contamination. Another possible cause of systematic angle errors is propagation time errors in radar signals that are transmitted and received via different antenna elements, e.g., in a digital beam generation.

In contrast to an error caused by a misalignment of the radar sensor, the systematic angle errors are angle-dependent as a rule. This means that the extent of the falsification of the angle measurement is a function of the respective positioning angle of the detected object.

In conventional methods for measuring the adjustment error, however, averaging is carried out across data of objects that are distributed across the entire positioning angle range, which means that the angle-dependent systematic errors are blurred in the statistical evaluation and not correctly mapped by the correction angle which essentially corresponds to the misalignment angle of the sensor.

In the method according to an example embodiment of the present invention, on the other hand, the subdivision of the positioning angle range into multiple sectors and the separate, sector-by-sector evaluation make it possible for the correction angles obtained for the different sectors to reflect not only the misalignment angle but also the systematic error for the angles that lie inside the particular sector. Although statistical averaging still takes place here as well, the averaging is carried out only across a single sector so that the result represents the systematic errors that actually occur for objects within this sector with greater accuracy.

If the position of the detected object then is to be determined within the scope of the assistance function, the correction angle associated with the sector in which the object was detected is used for the angle correction. This makes it possible to compensate for the errors in the angle measurement with greater precision.

The method is able to be applied both to angle measurements in azimuth and angle measurements in elevation.

Advantageous embodiments and further refinements of the present invention are disclosed herein.

Since the function indicating the systematic angle error as a function of the angle generally tends to be steady, the present method is able to be refined by carrying out an interpolation between the correction angles for two adjacent sectors in the event that the detected object does not lie precisely on the angle bisector of a sector.

The greater the number of sectors and thus the smaller the angle range taken up by each sector, the more accurate the agreement between the correction angles determined for these sectors and the actual angle error. On the other hand, however, the probability of detecting an object in the particular sensor also drops as the sizes of the sectors decrease, which means that more time is required to collect sufficient data for a statistical analysis.

With a certain restriction, the method according to the present invention also allows for a quantitative determination of the systematic angle error as a function of the angle. At least the variation of the angle error relative to a fixed reference value is able to be measured. However, if the angle error includes a constant component that is the same for all detected objects regardless of the azimuth angle, then this component has the same effect on a falsification of the angle measurement as an adjustment error of the sensor, with the result that it is impossible to distinguish these two error sources. If one examines the deviation between the angle error and some fixed reference value, on the other hand, it will be possible to compare the angle-dependent, systematic errors in different sectors with one another.

For two given sectors, which need not necessarily be adjacent to each other, or also for a group of three or more sectors, it can be determined in this way whether the systematic angle errors are identical in these sectors. If this is the case, then the sectors are able to be combined to form a larger angle range and the statistical evaluation can then be performed for this larger angle range. This increases the likelihood of detecting an object in this larger angle range and it shortens the measuring time required to record a sufficiently large sample of positioning data for a meaningful statistical analysis.

Below, an exemplary embodiment will be described in greater detail on the basis of the figures.

DETAILED DESCRIPTION OF EXAMPLE EMBODIMENTS

Figure 1:
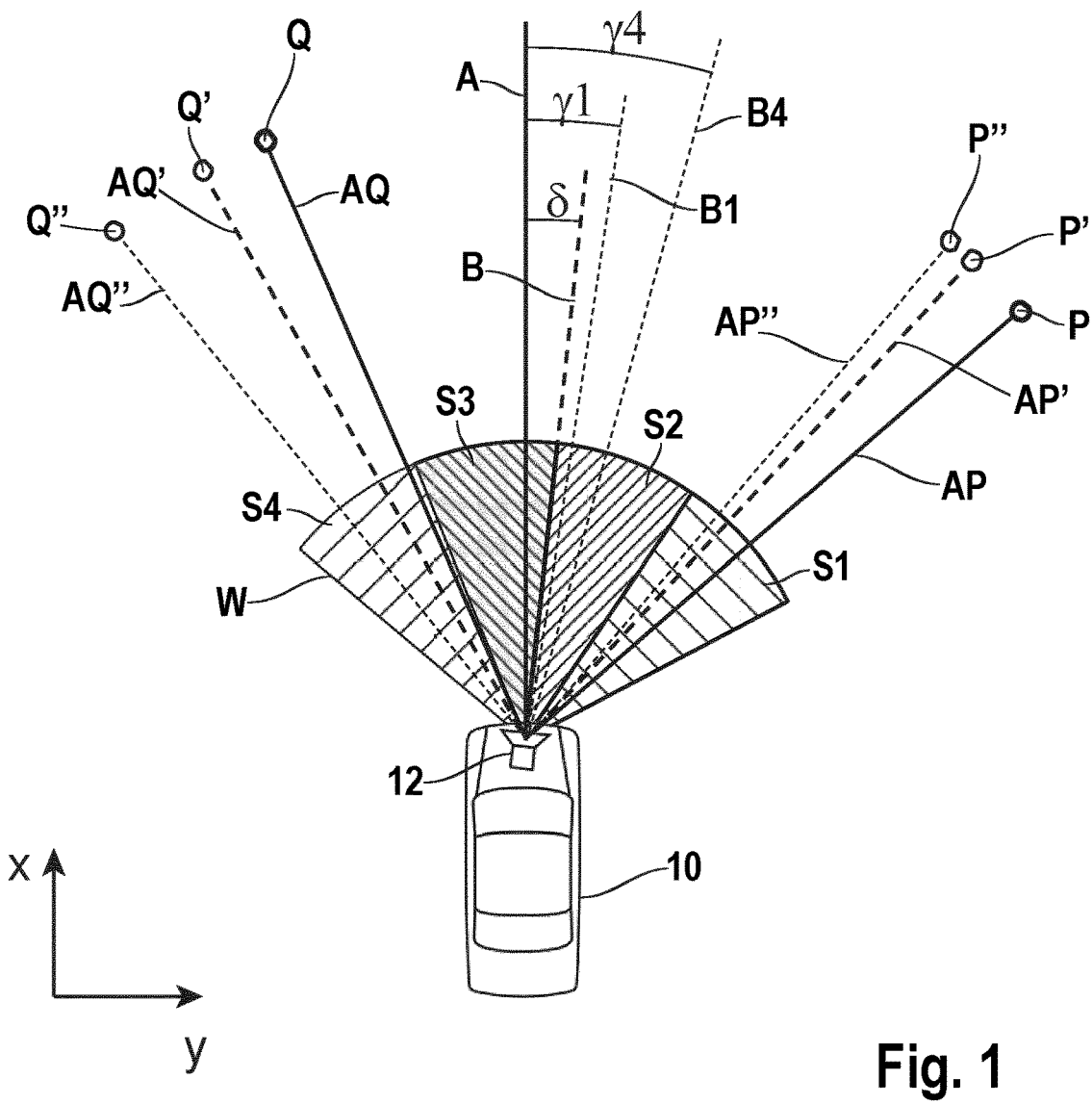
FIG. 1 shows an outline of a motor vehicle including a radar sensor which has an adjustment error, together with a diagram of a positioning angle range of the radar sensor.

FIG. 1 shows an outline of a motor vehicle 10 which has a radar sensor 12 directed toward the front in the driving direction.

An axis A indicates a longitudinal center axis of motor vehicle 10 extended in the driving direction. In the illustrated example, radar sensor 12 is not correctly aligned with axis A but exhibits a certain adjustment error, that is, its optical axis B forms an angle $\delta$ with axis A, which indicates the adjustment error of the radar sensor.

Radar sensor 12 has a positioning angle range W, which is depicted here as a circle sector that is symmetrical with respect to optical axis B.

Plotted in addition is a Cartesian coordinate system having an axis x oriented in the driving direction and an axis y oriented in the transverse direction of the vehicle. A point P indicates the true position of an object located by radar sensor 12 in this Cartesian coordinate system.

An axis AP connects radar sensor 12 to point P. The angle between axes A and AP is the true azimuth angle of the object at point P.

Because of the adjustment error, however, radar sensor 12 'sees' the object at a point P' on an axis AP', which is rotated by angle $\delta$ in relation to axis AP.

A point Q on an axis AQ indicates the true location of a further object that is detected by radar sensor 12. Because of the adjustment error, radar sensor 12 also sees this object at an assumed point Q' on an axis AQ', which is rotated by the angle $\delta$ in relation to axis AQ.

In the illustrated example, it is assumed that radar sensor 12 furthermore exhibits a systematic angle error, which has the result that the object which in truth is located at point P is detected at a location P'' on an axis AP''.

For the object that in reality is located at point Q, the angle error causes this object to be detected at a point Q'' on an axis AQ''.

In contrast to the adjustment error indicated by angle $\delta$, which is the same for all located objects regardless of the azimuth angle under which these objects are detected, the systemic angle error is angle-dependent. In FIG. 1, the angle error for the object at point P is indicated by the angle between the axes AP' and AP'', and for the object at point Q, the systematic angle error is given by the angle between the axes AQ' and AQ''. It can be gathered that these angle errors differ from one another.

As will still be described in greater detail, methods are available which are able to be used to calculate a correction angle that is equal in its amount to angle $\delta$ and corrects the adjustment error, but under the assumption that no angle-dependent, systematic angle error exists. If one were to perform this correction for radar sensor 12 according to FIG. 1, then a correction angle would be obtained that does not exactly agree with angle $\delta$. If averaging is carried out across very many objects that are essentially uniformly distributed across positioning angle range W, then a correction angle would come about that is composed of angle $\delta$ (according to the adjustment error) and the average value of the systematic angle errors. Even if it were assumed that the average value of the systemic angle error is 0°, then only the differences between points P and P' and between Q and Q' would be eliminated in the correction, while the deviations between P' and P" and Q' and Q" would remain because of the angle-dependent, systematic angle errors.

In order to improve the accuracy of the correction, positioning angle range W in FIG. 1 has been subdivided into multiple (i.e., four in the illustrated example) sectors S1, S2, S3 and S4, which all have the same size in the illustrated example. The adjustment error is determined individually for each of these sectors. That means that only the data of objects that were detected within this sector are taken into account in the determination of the adjustment error for one of the sectors in a statistical evaluation of the positioning data. In this way, a virtual optical axis that is rotated by a correction angle in relation to axis A is obtained for each sector. FIG. 1 shows virtual axes B1 and B4 for sectors S1 and S4 as well as associated correction angles γ1 and γ4. Axes B1 and B4 are virtual optical axes in the sense that they do not indicate the actual misalignment of radar sensor 12 but rather the apparent misalignment under consideration of the angle error that applies to the particular sector.

Once correction angles γ1-γ4 for each sector have been ascertained in this way following a certain measuring time during which sufficient statistical data were collected for each sector and radar sensor 12 supplies data for an assistance function, the azimuth angle for each detected object is corrected by the correction angle that applies to sector S1-S4 in which the object was detected.

In the illustrated example, axis AQ", which indicates the positioning angle for the object in position Q", lies approximately in the center of sector S4. In this case, one would directly use associated correction angle γ4 for the correction of the adjustment error and the angle error. For the object in position P, on the other hand, axis AP" lies closer to the edge of sector S1. Starting from the plausible assumption that the angle errors and thus the correction angles vary steadily across the entire positioning angle range W, one would not directly use correction angle γ1 in this case but rather a correction angle that is obtained by an interpolation between γ1 and the corresponding correction angle for sector S2.

Figure 2:
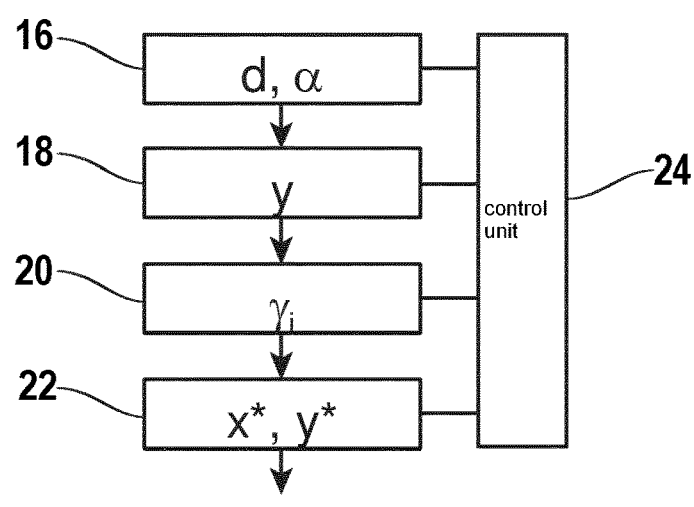
FIG. 2 shows a block diagram of a radar sensor by which the method according to the present invention can be carried out.

FIG. 2 shows, in the form of a block diagram, main components of radar sensor 12 that may be used to carry out the afore-described method. For each detected object, a transceiver unit 16 having an associated pre-evaluation unit supplies in each measuring cycle the distance d, the relative velocity of the object (which is not relevant here and thus not shown) and azimuth angle α, which may possibly be falsified by adjustment and angle errors. Distance d and azimuth angle α indicate the assumed position of a detected object in polar coordinates. A transformation unit 18 transforms the polar coordinates into Cartesian coordinates and thus supplies, among other things, coordinate y that indicates the transverse deviation of the object in relation to axis A for each object.

In an estimation module 20, correction angles $\gamma_i$ are determined for each sector S1-S4 of the positioning angle range. Only positioning data of objects that were detected in the sector for which the correction angle is determined are taken into account in the process.

A correction module 22 then corrects the measured azimuth angle α by the respective correction angle $\gamma_i$, possibly with an interpolation between two correction angles, and supplies corrected Cartesian coordinates x*, y*, which indicate the true position P and Q for each object, with greater accuracy.

The functions of the afore-described components of the radar sensor are controlled by a control unit 24.

Figure 3:
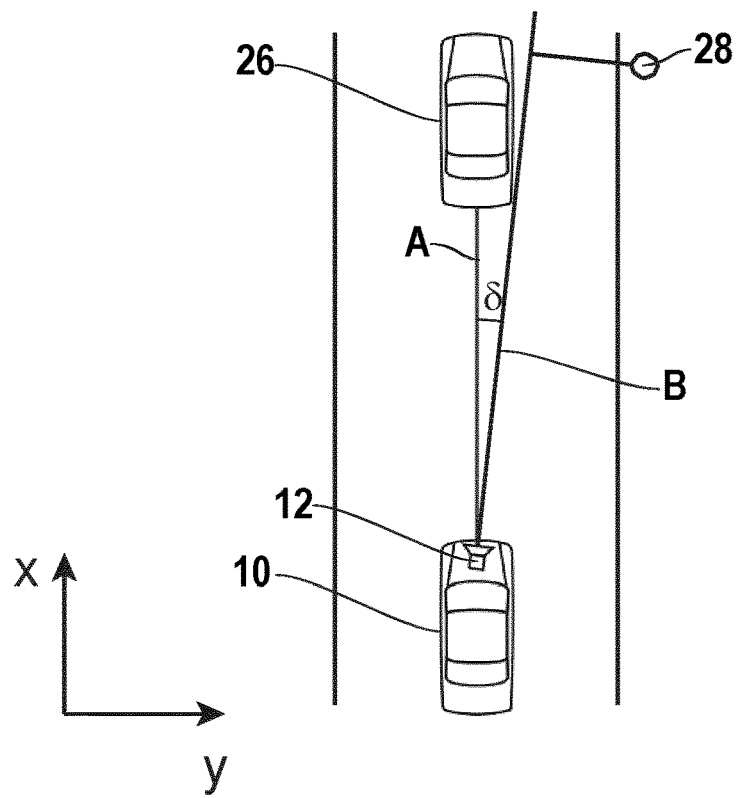
FIGS. 3 and 4 show diagrams to describe methods for measuring an adjustment error of the radar sensor.
Figure 4:
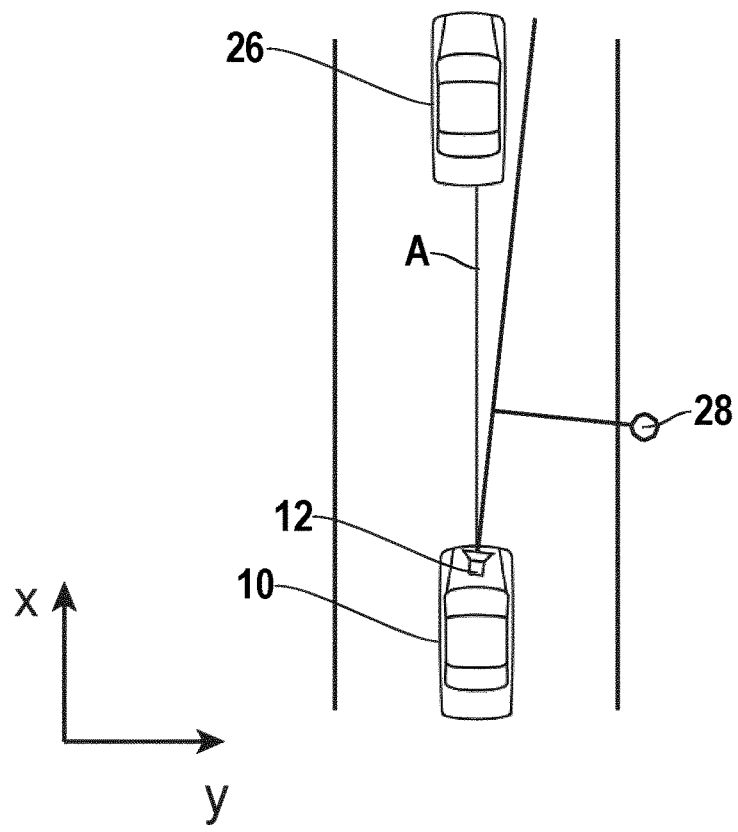

Based on FIGS. 3 and 4, examples of methods by which correction angles $\gamma_i$ are able to be estimated will now be illustrated.

FIG. 3 shows a traffic situation in which vehicle 10 equipped with radar sensor 12 tracks another vehicle 26 which travels directly ahead in the same lane. Radar sensor 12 exhibits an adjustment error indicated by angle δ. If the true position of vehicle 26 lies exactly on axis A as in the illustrated example, then radar sensor 12 measures an azimuth angle that agrees with angle δ in terms of its amount.

FIG. 4 shows the situation at a slightly later point in time. Vehicle 26 has not exactly kept its course and is now located slightly to the left of axis A. If vehicle 26 is tracked over a longer period of time and the measurement of the azimuth angle is repeated in every measuring cycle, then the measured azimuth angles will scatter uniformly around the δ value so that vehicle 26 will randomly deviate from axis A slightly to the right and then slightly to the left again. If the moving average is formed from the measured azimuth angles, then this average value will converge over time towards a limit value that indicates with high accuracy the desired correction angle, which is made up of angle δ and possibly a systematic angle error for the 0° direction of the radar sensor. The longer the measuring period and thus the greater the statistical basis, the more precisely the obtained limit value will map the "correct" correction angle.

Another method, which will likewise be described with the aid of FIGS. 3 and 4, is suitable for sectors of positioning angle range W that deviate more from axis A, such as sectors S1 and S4 in FIG. 1.

In FIG. 3, radar sensor 12 detects in one of these sectors a stationary object 28 which is located at the edge of the road and still has a relatively large distance from ego vehicle 10 in FIG. 3. In FIG. 4, vehicles 10 and 26 have moved on so that the distance of object 28 (in the x-direction) has decreased considerably.

Transformation unit 18 (FIG. 2) calculates the y-coordinate of object 28, among other things. If ego vehicle 10 constantly remains on axis A, then this coordinate y should not vary over time because object 28 is stationary (stationary objects can be identified by the fact that their radial velocity relative to the sensor multiplied by the cosine angle is inversely equal to the driving speed of the ego vehicle). Because of the misalignment error, however, transformation module 18 does not calculate the true y-coordinate of object 28 but rather the assumed y-coordinate in relation to optical axis B of the radar sensor. This assumed y-coordinate in FIG. 4 has increased considerably in comparison with FIG. 3. If this increase in the assumed y-coordinate is plotted against the distance traveled by ego vehicle 10, then a straight line is obtained (after a correction for the ego movement of the own vehicle, as the case may be), whose slope just corresponds to angle δ or the mechanical adjustment error plus the angle error for the particular sector. In this way, it is possible to obtain an estimated value for the correction angle already based on a single stationary object 28. However, this estimated value will still include a statistical measuring error. By a statistical evaluation of multiple stationary objects detected one after the other, the statistical error is able to be reduced and the accuracy therefore improved.

As may furthermore be gathered from FIGS. 3 and 4, the azimuth angle of object 28 measured by the radar sensor becomes larger the closer vehicle 10 comes to this object. In practice, the measured azimuth angle will therefore scan multiple sectors (S2, S1) of the positioning angle range so that separate evaluations for different sectors may already be carried out with the aid of a single object, and multiple correction angles are obtained as a result, which differ from one another because of the different angle errors in the particular sectors.

Figure 5:
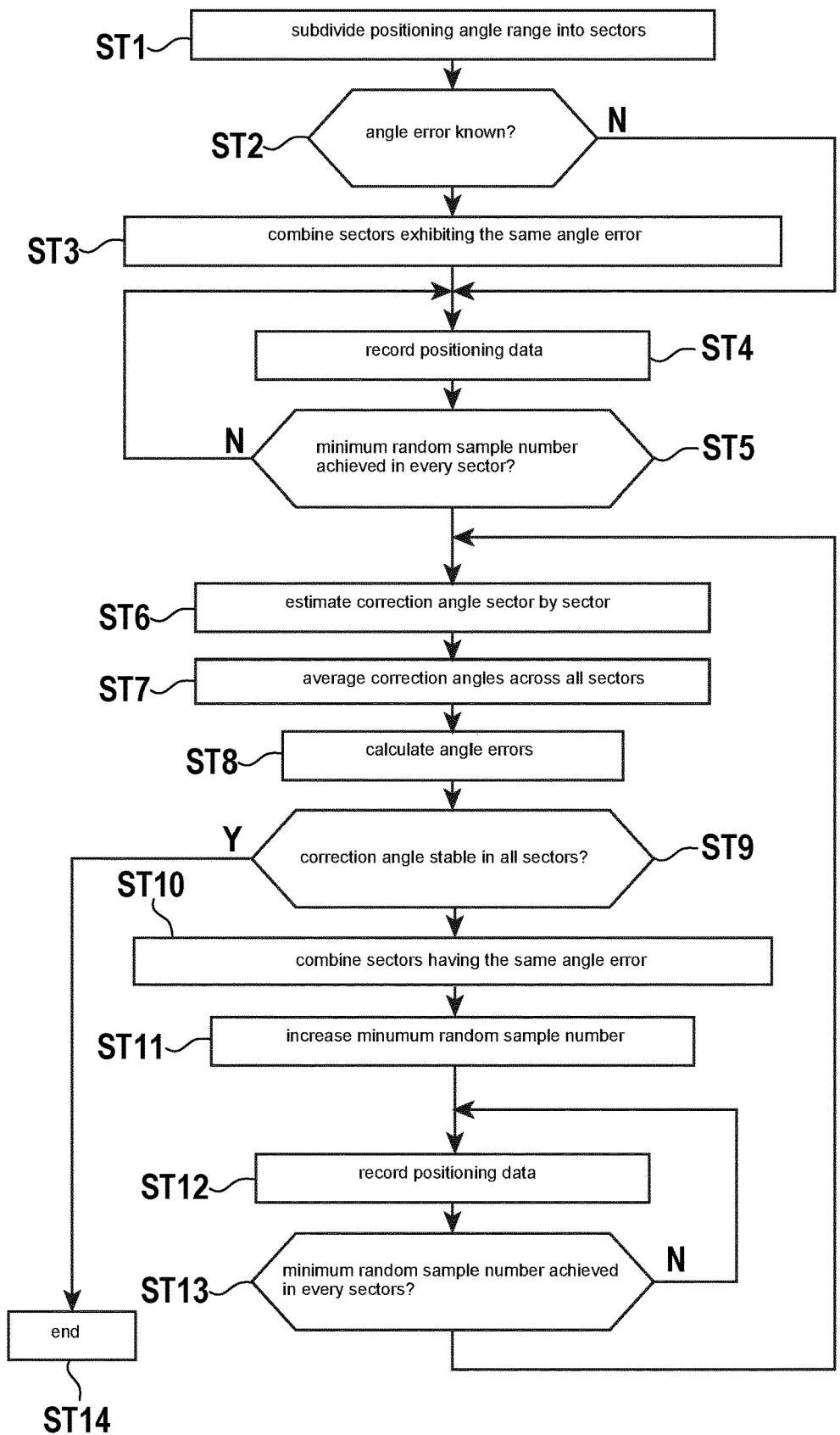
FIG. 5 shows a flow diagram for an example embodiment of the method according to the present invention.

One possible method sequence in the method according to the present invention will now be described with the aid of the flow diagram shown in FIG. 5. The method is implemented in control unit 24 of the radar sensor, for instance.

In step ST1, positioning angle range W is subdivided into sectors, e.g., four sectors S1-S4 according to FIG. 1, or optionally also into a larger number of sectors.

In step ST2, it is checked whether the systematic angle errors of radar sensor 12 for the sectors determined in step ST1 are already known. If this is the case, then the particular sectors that exhibit the same angle error are combined into a single (possibly not contiguous) sector in step ST3.

If the angle errors are not yet known (N in step ST2), then step ST3 will be skipped.

In step ST4, the positioning data of detected objects are individually recorded by sectors.

In step ST5, it is checked whether the number of objects for which positioning data were recorded in step ST4 has already reached a certain minimum value in each sector so that the random sample is of a sufficient size for the statistical evaluation. As long as that is not the case (N), a return to step ST4 takes place and the data recording continues.

If a sufficient number of random samples has been reached in all sectors, the adjustment error is estimated sector by sector in step ST6, e.g., with the aid of one of the methods described on the basis of FIGS. 3 and 4.

In step ST7, averaging across the correction angles obtained in step ST6 is then implemented, i.e., weighted according to the random sample number in the individual sectors. This effectively leads to the determination of an average correction angle for the entire positioning angle range W. This average correction angle includes the mechanical adjustment error of radar sensor 12 on the one hand, and a constant share of the systematic angle errors that is not angle-dependent, on the other hand.

In step ST8, the angle errors are then calculated for each individual sector by subtracting the average correction angle obtained in step ST7 from the correction angle obtained in step ST6.

In step ST9, the correction angles obtained in step ST6 are compared with correction angles stored earlier for the same sectors, and a check is performed whether the correction angle is stable in all sectors, i.e., whether the deviations between the correction angles obtained in the more recent past for the same sector lie within a predefined tolerance interval. If this is not the case, then all sectors exhibiting the same angle error are combined once again in step ST10. This step is a repetition of step ST3, but now under consideration of the angle errors obtained or possibly updated only in step ST8.

In step ST11, the minimum random sample number is increased for each sector, and in step ST12, positioning data for each sector are recorded anew.

In step ST13, it is checked whether the (greater) minimum number of random samples or convergence has been reached. If that is not yet the case (N), the recording of the positioning data continues in step ST12, and steps ST12 and ST13 are repeated until the minimum number of random samples is reached. If that is the case, a return to step ST6 takes place and the loop including steps ST6 to ST12 is cyclically repeated until it is determined in step ST9 that the correction angle is stable in all sectors. It is understood that the correction angles that were obtained in the different repetitions of loop ST6 to ST13 are compared to one another in this step ST9. If the sequence of correction angles is sufficiently stable (Y), the method terminates with step ST14.

Combining sectors in steps ST3 and ST10 makes it possible to detect more objects per sector within a given time interval so that the method converges more quickly or statistical fluctuations are further suppressed in the sectors that were enlarged in this way.

In addition, if the correction angles are not yet stable in all sectors, it can optionally be checked in step ST9 whether the correction angles for at least two or more sectors exhibit a certain measure of convergence. If this is not the case, then step ST10 will be skipped and only further data are collected in the loop ST11-ST6-ST9. The combining of sectors exhibiting the same angle error will then be undertaken only for the particular sectors in which the angle errors have a sufficient measure of stability and reliability.

The described method is able to be repeated at certain time intervals during the service life of motor vehicle 10 in order to check the calibration of the radar sensor for adjustment errors and systematic angle errors. It is also possible to carry out the method in the background on a continuous basis while the radar sensor supplies data for assistance functions.

In the same way it is also possible to vary the subdivision of the positioning angle range into sectors in step ST1 in different repetitions of the present method. For example, it is possible to start off with a relatively small number of sectors in order to obtain statistically meaningful results as quickly as possible, albeit with a relatively rough acquisition of the angle-dependent angle errors, whereupon a larger number of sectors may then be used in a second step in order to determine the curve indicating the angle dependency of the systematic errors with a higher resolution. If the positioning data in the different program sequences are stored, then the database in the program sequence can be enlarged again by the greater number of sectors by utilizing also the positioning data of the earlier program sequence with the smaller number of sectors by carrying out the subdivision into the new sectors retroactively.

What is claimed is:

1. A method for a radar sensor for motor vehicles, the method comprising:
with respect to each of at least one direction, calculating a plurality of correction angles for a misalignment of the radar sensor, the plurality of correction angles being different than one another, the calculating being performed by, for each of a plurality of angular sub-ranges of a beamwidth of the radar sensor in the respective direction:
obtaining a respective set of positioning data recorded by the radar sensor in the respective angular sub-range;
statistically evaluating the respective set of positioning data that were recorded by the radar sensor in the respective angular sub-range;
based on the respective statistical evaluation performed for the respective angular sub-range, determining a respective value of a misalignment of the radar sensor; and
determining a respective one of the plurality of correction angles for the respective angular sub-range based on the respective value of the misalignment determined for the respective angular sub-range.

2. The method as recited in claim 1, further comprising:
obtaining an object position measurement of the radar sensor regarding a sensed object;
depending on a positional relationship of (i) an angular location within the beamwidth that is associated with the object position measurement to (ii) the plurality of angular sub-ranges, selecting at least one of the plurality of correction angles; and
based on the selection, correcting the object position measurement using the selected at least one of the plurality of correction angles.

3. The method as recited in claim 2, wherein the selected at least one of the plurality of correction angles includes multiple ones of the plurality of correction angles, and the correction of the object position measurement regarding the sensed object includes an interpolation of the multiple ones of the plurality of correction angles.

4. The method as recited in claim 3, wherein the multiple ones of the plurality of correction angles include (i) one of the plurality of correction angles which has been determined for a first one of the angular sub-ranges in which a position of the object position measurement is located and (ii) another of the plurality of correction angles which has been determined for a second one of the angular sub-ranges, which is adjacent to the first one of the angular sub-ranges.

5. The method as recited in claim 4, wherein the other of the plurality of correction angles is selected based on a nearness of the position of the object position measurement to the second one of the angular sub-ranges.

6. A method for estimating correction angles in a radar sensor for motor vehicles, the method comprising:
calculating a correction angle that takes a misalignment of the radar sensor into account by statistically evaluating positioning data that were recorded by the radar sensor;
wherein:
a positioning angle range of the radar sensor is subdivided into multiple different sectors, and the statistical evaluation of the positioning data is carried out separately for the different sectors so that an individual correction angle is obtained for each sector;
an angle-dependent portion of a systematic angle error of the radar sensor is stored for each of the different sectors; and
when the stored angle-dependent portion is the same for two or more of the different sectors, the subdivision into the different sectors is modified in such a way that sectors for which a value is the same are combined to form to a larger sector.

7. The method as recited in claim 6, wherein the angle-dependent portion of the systematic angle errors is determined using the correction angles calculated in the course of the method.

\* \* \* \* \*